May 9, 1961 C. E. TIBBALS 2,983,361
APPARATUS FOR MAKING PARQUET FLOORING BLOCKS
Filed March 31, 1958 4 Sheets-Sheet 1
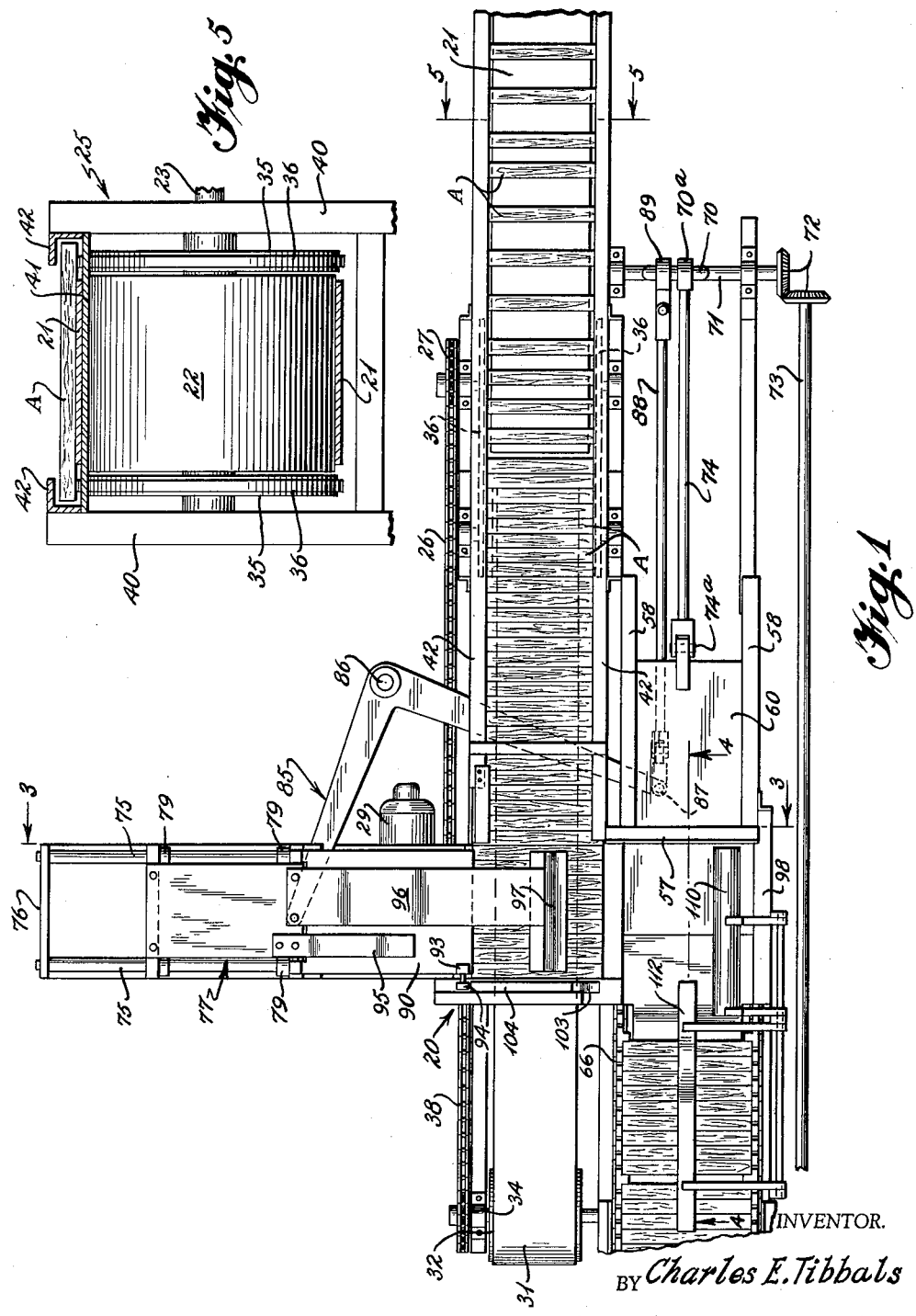
INVENTOR.
Charles E. Tibbals
BY Mead, Browne, Schuyler & Beveridge
ATTORNEYS May 9, 1961  C. E. TIBBALS  2,983,361
APPARATUS FOR MAKING PARQUET FLOORING BLOCKS
Filed March 31, 1958  4 Sheets-Sheet 2
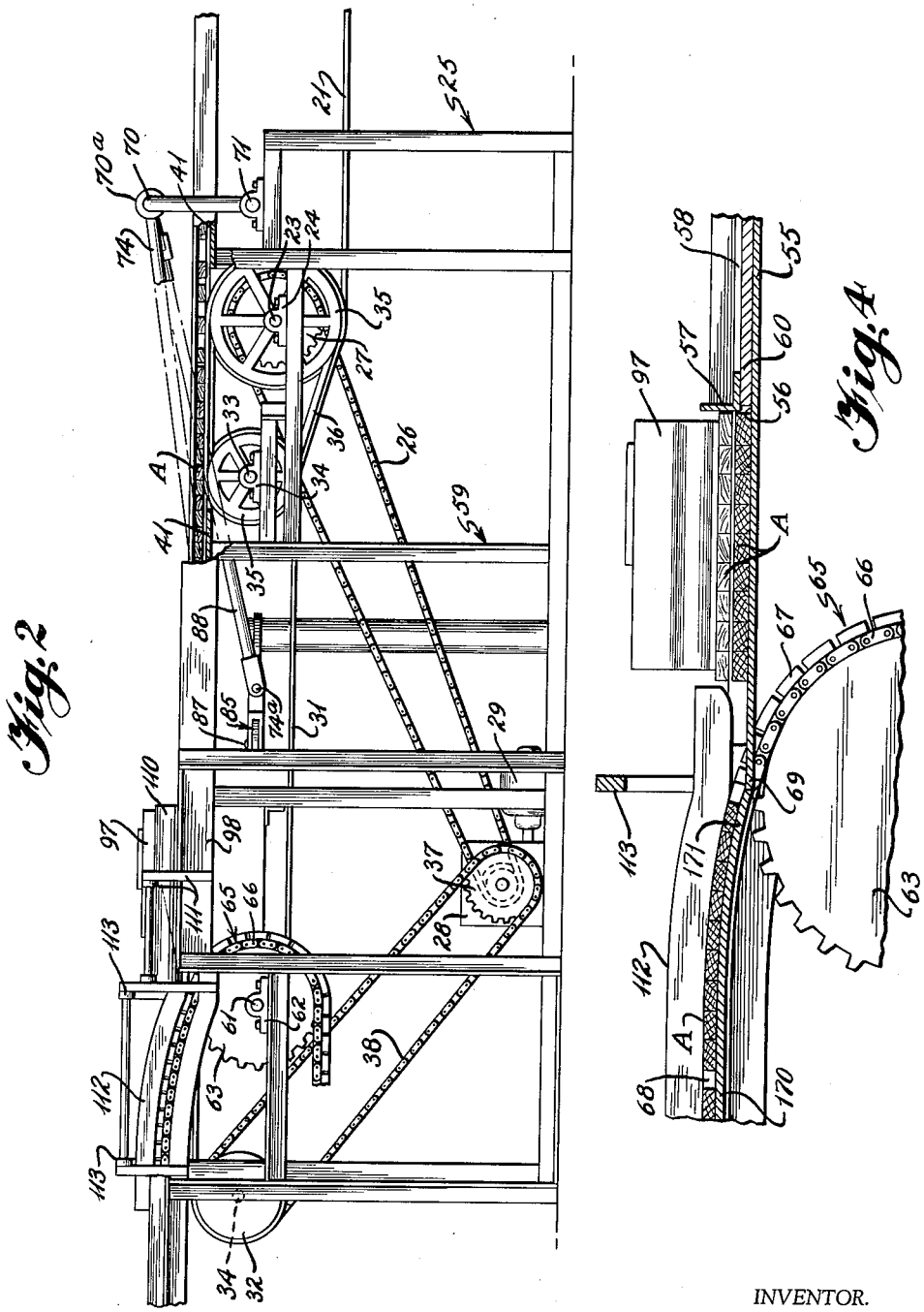
INVENTOR.
Charles E. Tibbals
BY
Mead, Browne, Schuyler and Beveridge
ATTORNEYS

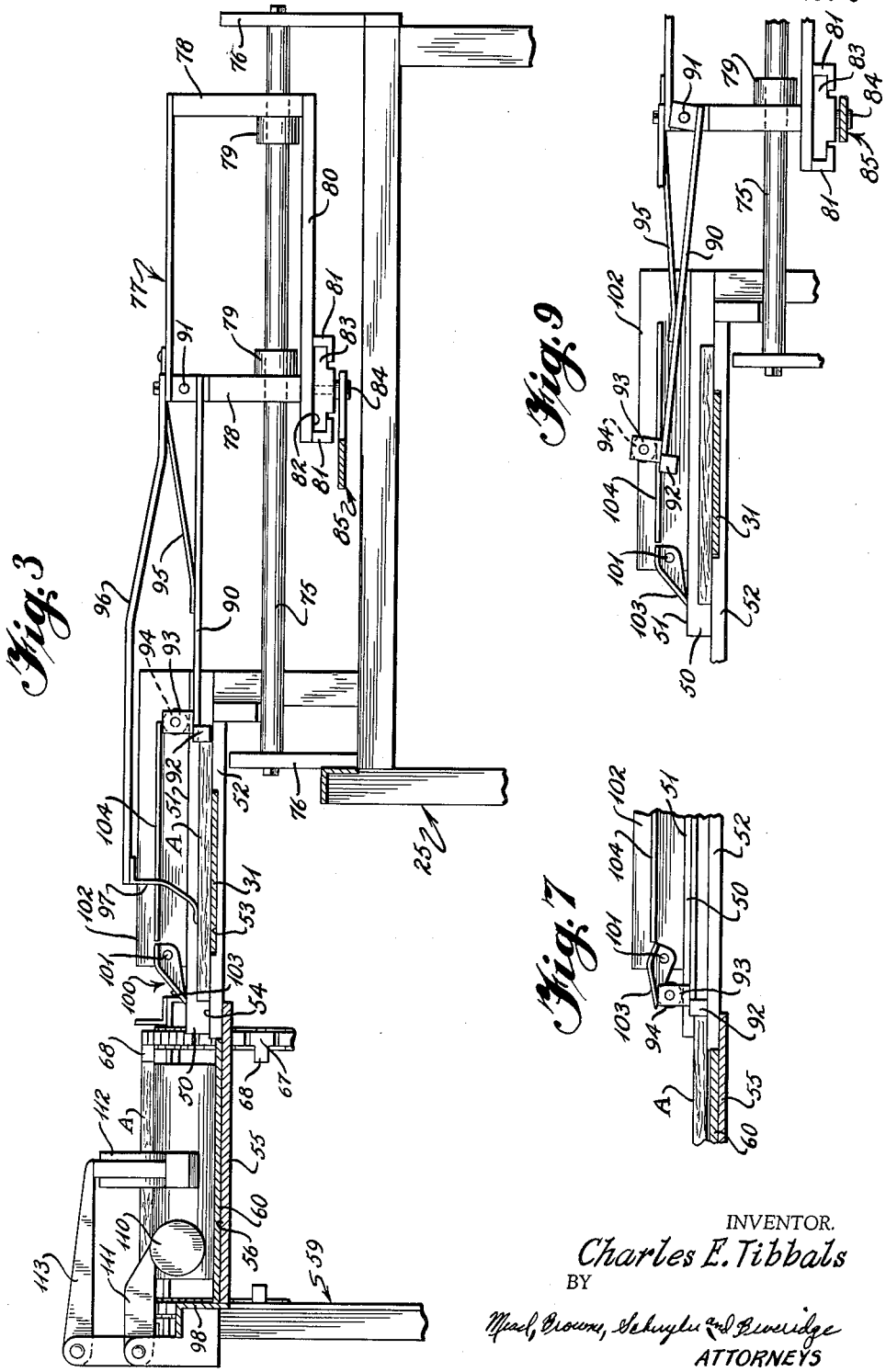

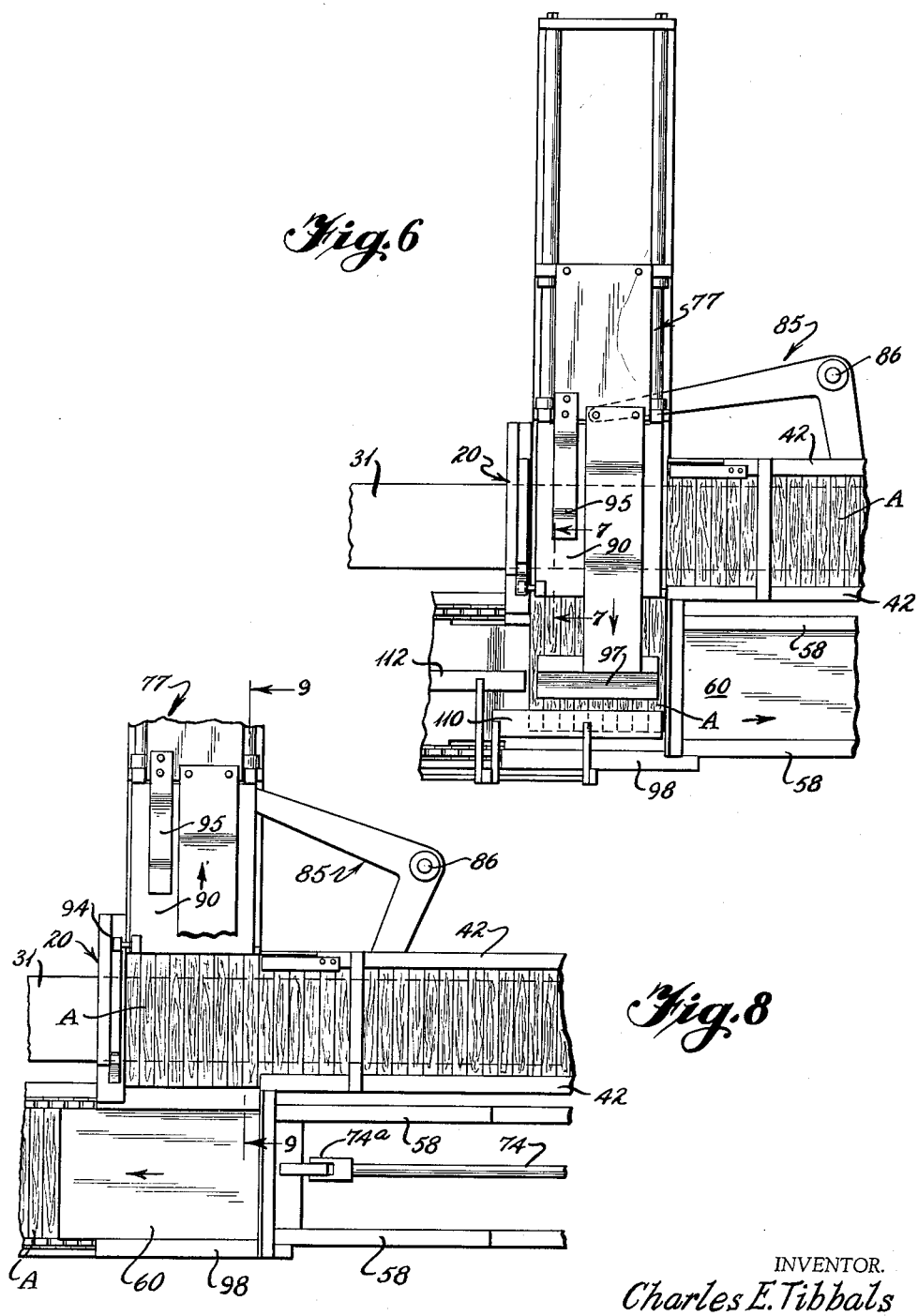

United States Patent Office 2,983,361
Patented May 9, 1961

2,983,361

APPARATUS FOR MAKING PARQUET FLOORING BLOCKS

Charles E. Tibbals, Oneida, Tenn., assignor to Wood Products Development Company, Inc., Oneida, Tenn., a corporation of Tennessee Filed Mar. 31, 1958, Ser. No. 724,968

5 Claims. (Cl. 198—24)

The present invention relates to a method of and apparatus for making parquet flooring blocks and more particularly to a method of and apparatus for separating and conveying a group of individual slats of such number and relation as to form a single parquet flooring block.

This application is a continuation-in-part of my earlier application entitled, "Method of and Apparatus for Making Parquet Flooring Blocks," filed in the United States Patent Office on May 6, 1957, and bearing Serial Number 657,184.

In my above-identified earlier application, I have disclosed an apparatus for making a parquet flooring block by the securing of a plurality of individual slats to a single integrated structure by means of a backing element applied to the undersurfaces of the slats. During the manufacture of the blocks, it is necessary to separate the slats into individual block units each of which contains the number of slats appropriate to the formation of a block of the final desired size. Further, this group of slats must be placed upon a chain-type conveyor having lugs or similar means separating the slats, so as to maintain the identity and structural integrity of the groups during the further processing.

My earlier filed disclosure proposed the use of a transversely actuable shuttle conveyor having a plurality of pans each of which bears a group of slats. I have now found that this transversely reciprocating pan-type conveyor is cumbersome, expensive, and difficult to maintain during actual operation of the block-making apparatus. Further, the utilization of the pan-type conveyor necessitated the provision of electrically controlled, pneumatically operated holding means for retaining slats from movement onto the conveyor until the entire conveyor needed refilling.

I have now invented a new and improved method of and apparatus for making parquet flooring blocks which utilizes an improved separating and conveying mechanism and method. More particularly, I now utilize a pair of longitudinally parallel, transversely spaced conveying means, such as belts or chains, a single transversely movable shuttle plate for contacting slats on one of the conveying means and displacing the slats transversely into longitudinal alignment with a second of the conveying means, and a longitudinally displaceable push plate alignable with the slats displaced by the shuttle plate and reciprocable in alignment with the second conveying means. The two plates are driven 180° out of phase to sequentially move a desired group of slats transversely and then longitudinally, thereby effecting a transfer of the slats to the assembly apparatus after an initial separation of the group of slats.

It is therefore an important object of the present invention to provide an improved method of and apparatus for making parquet flooring blocks.

Another important object of this invention is the provision of an apparatus for making parquet flooring blocks and incorporating improved transfer means for separating, transferring, and displacing a group of slats between a slat forming apparatus and a block assembly apparatus.

It is a further object of this invention to provide an improved method of making parquet flooring blocks wherein a number of slats sufficient to form a final block are displaced transversely from one conveying means to another and finally deposited upon the second conveying means.

Yet another important object is the provision of a machine for making parquet flooring blocks incorporating a pair of parallel conveying means, a shuttle plate reciprocal to remove an appropriate number of slats from one conveyor, transfer the slats transversely to the second conveyor, and deposit the slats in alignment with the second conveyor for transfer to the second conveyor by means of a push plate.

Still another important object of this invention is the provision of an improved apparatus for making parquet flooring blocks wherein a pair of slat-contacting reciprocal actuating elements operate in timed sequence to separate a group of slats from an elongated column of slats, transfer the slats to a position aligned with an assembly conveyor, and deposit the slats on the conveyor.

Other objects of the present invention will be apparent from the following description when taken in conjunction with the attached drawings.

On the drawings:

Fig. 1 is a plan view of a portion of an apparatus of the present invention for making parquet flooring blocks;

Fig. 2 is an elevational side view of the apparatus illustrated in Fig. 1;

Fig. 3 is a fragmentary sectional view taken along the plane 3—3 of Fig. 1;

Fig. 4 is an enlarged sectional view taken on the plane 4—4 of Fig. 1;

Fig. 5 is an enlarged sectional view taken on the plane 5—5 of Fig. 1;

Fig. 6 is a fragmentary plan view similar to Fig. 1 and illustrating the apparatus in an adjusted position assumed during its operation;

Fig. 7 is a fragmentary sectional view taken on the plane 7—7 of Fig. 6;

Fig. 8 is a fragmentary plan view similar to Fig. 6, but illustrating another adjusted position of the apparatus; and Fig. 9 is an enlarged sectional view taken on the plane 9—9 of Fig. 8.

As shown on the drawings:

In Fig. 1, reference numeral 20 refers generally to an apparatus of the present invention which actually comprises a portion of the complete apparatus illustrated in my above-identified patent application Serial Number 657,184, filed May 6, 1957.

The apparatus 20 generally comprises a conveyor belt 21 wrapped or trained about a drive pulley 22 disposed on a transverse shaft 23 journalled, as in bearings 24, upon a supporting framework 25. The pulley 22 is driven, as through a chain 26, lapping sprocket 27 disposed on the shaft 23, from a suitable source of power, such as a speed changer 28 driven by an electric motor 29. A second conveyor belt 31 laps a pair of spaced pulleys 32 to run in longitudinal alignment with the belt 21. The pulleys 32 are disposed on transverse shafts 33, respectively journalled on the frame 25 in bearings 34.

As illustrated in Figs. 2 and 5, of the drawings, the pulley shaft 23 of the pulley 22 and the adjacent pulley shaft 33 for the one pulley 32 are also provided with V-belt pulleys 35 adjacent each axial extremity of the appropriate belt pulley 22 or 32. These V-belt pulleys are lapped by V-belts 36. It will be noted that the belt pulleys 22 and 32 and the associated V-belt pulleys 35, respectively, are of the same size so that a continuous conveying surface is provided by conveying belt 21, V-belts 36, and conveying belt 31.

The forward pulley 32 is driven by the motor 29 and speed changer 28 through a sprocket 37 and a chain 38. Preferably, the sprocket sizes are such that the belt 21 is driven at a speed greater than the belt 31 for a purpose to be hereinafter more fully described. Inasmuch as these two belts are driven at differential speeds, there will be some slip between the V-belt 36 and the V-belt pulleys 35. However, such slip will be readily accommodated by the V-belt and V-belt pulley assembly.

As best shown in Figs. 1, 4 and 5, the frame 25 includes a pair of upwardly extending stanchions or supports 40 joined adjacent their upper extremities by a transverse plate 41 over which the belt 21 runs. The plate 41 thus forms a floor for the belt, so that the plate-supported belt provides a support surface which is not deflected by the weight or tension of the belt. Superposed over the plate 41 are a pair of longitudinally extending angle irons 42 having vertical legs secured to the support elements 41 and inwardly projecting upper legs spaced from the plate 41 to provide a channel within which a column of slats A may travel. The slats A are individual, rectangular pieces of wood which are to be assembled into parquet flooring units. These slats are similar to those described and illustrated in my above-identified earlier co-pending patent application.

The column of slats A is supplied by a slat cutting and sizing apparatus similar to that described in my earlier filed application and effective to provide a flow of slats onto the belt 21 to be confined thereon and to be retained in column by the belt and the overlying angle irons 42. It will be noted that some end and vertical clearance is provided for these slats, but the slats will be generally guided and aligned upon the belt 21, both by inter-slat abutment and by the various guiding elements.

It will be noted that the side rails 42 overlie not only the belt 21, but also the V-belts 36 and the belt 31. However, the guiding surface or plate 41 is interrupted at that portion overlying the pulleys 22 and 32. The interruption of the plate does not result in any loss of support, confinement, or alignment of the slats A, inasmuch as the V-belts 36 support the slats at this specific area. Further, the utilization of coaxial, substantially uniformly sized pulleys 22, 32 and 35, and the merging of the paths of conveying travel of the belts 21, 31 and 36 all result in the uniform support for and guiding of the slats across the gap between the belts 21 and 31.

The reason for splitting the conveying surface defined by the belts 21 and 31 by the spacing of the terminal pulleys 22 and 32, respectively, will be readily appreciated when it is understood that the belt 21 travels at a much higher rate of speed than the belt 31 so that a constant supply of slats to the belt 31 is maintained. Any interruption in this supply of slats for any relatively short period of time will merely reduce the inventory of slats remaining upon the belt 31, with freshly cut slats being rapidly supplied to the belt 31 by the faster moving belt 21.

Interposed in the path of movement of the slats and extending transversely across at least the full extent of the belt 31 is a generally rectangular stop element 50, best illustrated in Figs. 3, 7 and 9. This stop element 50 has a planar upper surface 51 which defines a track also extending transversely of the belt 31 for a purpose to be hereinafter more fully described.

This stop element 50 is carried by the framework 25 and lies adjacent a table 52 also carried by the framework 25 and provided with an upwardly opening, longitudinally extending groove 53 of substantial transverse dimension. This groove 53 is adapted to receive the belt 31 therein and the table 52 serves to support the belt while the free upper, non-grooved surface 54 thereof supports the individual slats A, as best illustrated in Fig. 6 of the drawings. The table surface 54 thus provides a surface along which the slats may slide with full lateral support, i.e., support throughout their entire longitudinal extent, thereby avoiding tipping or relative misalignment of the individual slats A.

Immediately adjacent the transverse table 52 is a transversely aligned planar support 55 having a free exposed upper surface 56 generally laterally aligned with, but slightly below, the horizontal level of the free upper surface 54 of the table 52. Slidably contacting the upper support surface 56 is a longitudinally reciprocable push plate 60. This push plate 60 is movable longitudinally over the support surface 56 by suitable actuating means (to be hereinafter more fully described), and the push plate 60 is confined for reciprocation by an upper angle iron 57 (Fig. 4) spaced from the surface 56 and extending transversely thereof and by similar longitudinally extending side angle irons 58. Of course, the support plate 55 and the angle irons 57 and 58 are all carried by suitable supporting structure 59 which need not be described in detail.

Also supported by the framework 59 and located forwardly of the support surface 55 is a transverse shaft 61 journalled in bearings 62 and supporting a pair of transversely spaced sprockets 63 (Fig. 2). Lapped about each of the sprockets 63 is an assembly chain indicated generally at 65 and of the type specifically described and claimed in my above-identified earlier filed application. This chain 65 consists of a plurality of links 66 joining individual side blocks 67. The chain 66 and the blocks 67 form an articulated structure capable of deflection about relatively small sprockets 63 and capable of laterally confining the slats A therebetween. Actually, the pair of sprockets 63 are spaced apart through a distance slightly greater than the longitudinal dimension of the slats and the chain blocks 67 contact the respective longitudinal end surfaces of the slats A, as best illustrated in Figs. 1, 4 and 8. At uniformly spaced intervals along the length of the chain 65 are located inwardly projecting lugs 68 carried by individual blocks 67 of the chain and serving to separate groups of slats along the length of the chain. These lugs 68 overlap the longitudinal terminal ends of the slats A and serve to carry the slats longitudinally in the direction of chain travel.

Also, it will be noted that the guide or support surface 55 terminates, as at 69, in substantial vertical alignment with the axis 61 of the sprockets 63. A slat-support 170 of substantially planar form is provided to support the slats A from underneath as the slats are advanced by the chain lugs 68. The support element 170 is provided with a downturned, convex terminal portion 171 which blends smoothly with the periphery of the sprockets 63 so that the chains 65 are forced into a convex configuration at that portion of their travel at which they depart from the periphery of the sprockets 63. As explained in my earlier filed and above-identified patent application, this convex configuration of the chain is important inasmuch as it spreads the lugs 68 and provides for the ready entry of a group of slats A intermediate adjacent lugs of the chain.

As will be readily appreciated from a study of the drawings, reciprocation of the push plate 60 will move any slats A on the support surface 56 forwardly onto the chain 65. This reciprocation of the push plate 60 is carried out by means of a crank 70 formed in a transverse drive shaft 71 driven by suitable means, as by bevel gears 72 from a line shaft 73. This line shaft 73 is driven in synchronism with the assembly chains 65 by suitable means (not shown), as illustrated and described in my earlier filed patent application. Disposed upon the crank 70 is a connecting rod bearing 70a which interconnects the crank, and a connecting rod 74 is pivotally connected as at 74a, to the rear end of the push plate 60. It is obvious that rotation of the shaft 71 will, through the crank 70 and the connecting rod 74, reciprocate the push plate 60. In Fig. 1 of the drawings, the push plate is illustrated in its medial position with the crank on dead vertical center. In Fig. 8 of the drawings, the push plate 60 is illustrated in its forwardmost position, i.e., with the shaft 71 rotated 270° in a clockwise direction from its illustrated position of Fig. 1.

It is obvious that movement of the push plate 60 from its illustrated position of Fig. 1 to its illustrated position of Fig. 8 will push forwardly onto the chains any slats interposed in its path of movement.

The movement of the slats transversely into longitudinal alignment with the push plate 60 is effected by the transfer mechanism which forms the primary novel subject matter of this invention. This transfer mechanism is best illustrated in Figs. 3, 6 and 8 of the drawings, wherein it will be seen that the supporting framework 25 includes a pair of transversely extending, generally cylindrical guide rods 75 supported at either end by vertically extending support plates 76. Mounted upon these guide rods for axial reciprocation along the length thereof is a supporting carriage indicated generally at 77 and including a pair of vertical carriage standards 78 for each rod 75 and guide collars 79 secured to the standards 78 for increasing the bearing areas of the standards 78 upon the rods 75.

A lower transversely extending plate 80 joins the four standards 78 and carries a pair of lower angle irons 81 cooperatively defining a longitudinal slide 82. Disposed in the slide 82 for reciprocation therein is a bearing block 83 carrying a depending stud 84 connected to one end of a bell crank 85. This bell crank 85 is medially pivoted, as at 86, to the general supporting structure 25 and the other end 87 of the bell crank is pivotally connected to a connecting rod 88. The connecting rod 88 serves to connect the end 87 of the bell crank through a connecting bearing 89 to the crank 70 of the shaft 71 heretofore described.

The carriage 77 supports a transversely movable shuttle plate 90 which is pivotally connected, as at 91, to the carriage 77 or, more particularly, to the carriage standards 78. The shuttle plate 90 carries at its forward end a depending transverse abutment 92 adapted to contact the adjacent transverse edges of any slats A interposed in the path of movement of the shuttle plate.

Adjacent one side of the generally rectangular shuttle plate 90 is an upstanding plate 93 upon which is journalled a cam follower or roller 94. This cam follower or roller 94 contacts the upper guide edge 51 of the abutment 50, and the roller is urged into engagement with the surface 51 by suitable means, as by a leaf spring 95 secured to the reciprocating carriage 77. Also carried by the carriage 77 is a fixed hold-down element 96 reciprocable with the carriage and having a depending terminal spring extension 97 contacting the exposed upper surfaces of the slats A and serving to hold down the slats during their reciprocation with the shuttle plate 90.

It will be appreciated that reciprocation of the carriage 77 in a transverse direction as determined by the guide rods 75 will move the shuttle plate 90 transversely to convey any slats A interposed in the path of movement of the shuttle plate onto the support surface 56 or onto the free upper surface of the pusher 60. Such transverse movement of the slats A will bring them into contact with an angular abutment 98 carried by the supporting structure 59 immediately adjacent the path of movement of the pusher 60. It will be noted that the pusher 60 occupies a lower horizontal plane than the exposed upper surface 54 of the support element 52 for the slats. Therefore, the slats A will be moved over and onto the top of the pusher 60. As the pusher moves rearwardly, the slats will abut the transverse angle iron 57 and so will not be pulled rearwardly with the pusher plate 60.

The correlation of movement of the transverse shuttle plate with movement of the longitudinally reciprocal pusher plate will be readily appreciated from a study of Figs. 1, 7 and 9. The utilization of the common crank 70 directly actuating the pusher plate 60 and the bell crank 85 effectively drives the pusher plate and the shuttle plate 180° out of phase, thereby sequentially displacing a group of slats transversely and then longitudinally. The ability of the slats to slide over the top surface of the pusher plate 60 removes the necessity for reciprocating the pusher plate completely out of the path of the slats as they are moved transversely by the shuttle plate 90. Also, it is not necessary to completely withdraw the shuttle plate 90 to the right (as viewed in Fig. 6) prior to the feeding of additional slats into position for transverse transfer upon the next reciprocatory movement of the shuttle plate.

As illustrated in Figs. 3, 7 and 9 of the drawings, a cam nose 100 is pivotally connected adjacent the upper or guide surface 51 of the abutment 50, as by a transverse pivot pin 101 secured to an upstanding support plate 102. This cam nose 100 has an inclined forward cam face 103 inclined vertically upwardly and backwardly toward the carriage 77 and having its rear end longitudinally aligned with an upper cam track 104. It will be recalled that shuttle plate 90 is pivotally connected, as at 91, to the carriage 77. Movement of the cam follower 94 along the upper cam track 103 and the cam track 104 will elevate the shuttle plate 90 as illustrated in Fig. 9 of the drawings, so that slats A may be conveyed beneath the shuttle plate 90 by the belt 31 even before the shuttle plate is completely retracted.

The whole cycle of operation is illustrated in Figs. 1, 3 and 6–9, wherein it will be seen that initial displacement to the left of the shuttle plate 90 will be in a single horizontal plane, thereby displacing the slats A onto the upper surface of the pusher 60. At the terminal end of the stroke of the shuttle plate 90, the cam nose 100 will be elevated about its pivot pin 101, as illustrated in Fig. 7. Reciprocal return movement of the shuttle plate 90 can occur only after completion of forward movement of the shuttle plate and movement of the cam follower beyond the cam nose 100. Such return movement will then necessitate travel of the cam follower upwardly on the upper cam surface 103 and the cam track 104, thereby elevating the free or forward end of the shuttle plate 90. Thus, the shuttle plate terminal surface 92 is elevated and slats A may be freely and readily moved beneath the shuttle plate.

To insure alignment of the slats and further to insure their flatwise engagement of the bottom surfaces with the upper surfaces of the pusher plate 60, a pair of hold-down devices are provided as best illustrated in Fig. 3 of the drawings. One of these hold-down devices comprises a cylindrical weight 110 mounted upon a pivot arm 111 carried by the supporting framework 59 and generally overlying the pusher plate. At the forward end of the stroke of the shuttle plate 90, the slats A lift the weight 111, the weight then bearing on the upper surface of the slats to hold them down tightly against the upper surface of the pusher plate and against the upper support surface 56 when the pusher plate has been completely retracted.

A second such hold-down device is an elongated arcuate guide 112 (Figs. 1 and 3) carried by pivot arms 113 likewise pivotally connected to the supporting elements 59 and generally overlying the convex nose 71 of the plate 70 heretofore described.

The slats A are held down on the pusher plate by the weight 110 as the plate 60 is withdrawn beneath the angle iron 57. The next forward movement of the plate 60 will advance the slats A onto the chains 65 so that the lugs 68 will propel the slats along the support surface 70.

Thus, the present invention provides an improved slat transfer mechanism for receiving slats from a source, advancing the slats in column with their longitudinal axes transverse to the direction of advancement, sequentially transversely moving a number of slats in a direction parallel to their longitudinal axes, the transverse movement separating from the slat column a desired number of slats to form a group thereof, then advancing groups of slats with their longitudinal axes transverse to the direction of advancement, and transferring the group of slats to a conveying mechanism.

While a preferred embodiment of my invention has been described above in detail, it will be understood that numerous modifications may be resorted to without departing from the scope of the following claims.

I claim:

1. In a machine for making parquet flooring blocks or the like, a transfer mechanism for separating and delivering a group of individual slats to an assembly mechanism, comprising a pair of continuously operable, longitudinally parallel, transversely spaced conveying means, a stop element in the path of movement of slats on a first of said conveying means to form a column of slats, a transversely reciprocating shuttle plate having a leading edge for contacting a group of slats on said first conveying means during movement of the shuttle plate in one direction only and displacing said group of slats transversely into longitudinal alignment with a second of said conveying means, means for elevating the leading edge of said shuttle plate to accommodate the entry thereunder of slats advanced by said first conveying means during return movement of the shuttle plate in the opposite direction, a longitudinally reciprocating pusher plate aligned with said second conveying means, and means for driving said shuttle plate and said pusher plate 180° out of phase to sequentially displace a group of slats transversely and then longitudinally, said means including a crankshaft, a direct connection from the crankshaft to one of said plates, and a bell-crank connection from the crankshaft to the other of said plates.

2. In a machine for making parquet flooring blocks or the like and including a first conveyor for advancing a solid column of slats longitudinally and a second conveyor for advancing spaced groups of slats longitudinally, said conveyors being longitudinally parallel and transversely spaced, the improvements of abutment means extending transversely of said first conveyor to halt the slats thereon in column, a transversely reciprocal shuttle plate adjacent said abutment means, said shuttle plate being movable toward said second conveyor and across the width of said first conveyor to displace a group of slats from said first conveyor into alignment with said second conveyor, means supporting said shuttle plate for vertical displacement at the end of its movement toward the first conveyor, cam means for elevating said shuttle plate, means for maintaining said shuttle plate elevated during return movement thereof, a longitudinally reciprocal pusher plate aligned with said second conveyor and with the group of slats displaced by said shuttle plate, and means for reciprocating said pusher plate 180° out of phase with respect to the operation of said transversely reciprocal shuttle plate to deposit the group of slats on said second conveyor.

3. In a machine for making parquet flooring blocks or the like, a transfer mechanism for separating and delivering a group of individual slats to an assembly mechanism, comprising a pair of longitudinally parallel transversely spaced conveying means, a transversely movable shuttle plate for contacting slats on a first of said conveying means and advancing said slats transversely into longitudinal alignment with a second of said conveying means, a longitudinally reciprocable pusher plate aligned with said second conveying means and having a planar upper surface receiving said slats thereon as said shuttle plate advances said slats, means for removing slats from said upper surface upon return movement of said pusher plate, said slats moving gravitationally into alignment with the leading edge of said pusher plate, and means for driving said shuttle plate and said pusher plate 180° out of phase to sequentially displace a group of slats transversely and then longitudinally.

4. In a machine for making parquet flooring blocks or the like and including a first conveyor for advancing a solid column of slats longitudinally and a second conveyor for advancing spaced groups of slats longitudinally, said conveyors being longitudinally parallel and transversely spaced, the improvements of abutment means extending transversely of said first conveyor, a transversely reciprocal shuttle plate adjacent said abutment means and extensible across the width of said first conveyor to displace a group of slats from said first conveyor into alignment with said second conveyor, a longitudinally reciprocal pusher plate aligned with said second conveyor and with the group of slats displaced by said shuttle plate, said pusher plate being reciprocal in a plane lower than the plane of movement of said shuttle plate and having a plane upper surface for receiving slats thereon, means for withdrawing said pusher plate from beneath said group of slats deposited thereon by said shuttle plate, and means for advancing said pusher plate to deposit the group of slats on said second conveyor.

5. In a machine for making parquet flooring blocks or the like and including a first conveyor for advancing a solid column of slats longitudinally and a second conveyor for advancing spaced groups of slats longitudinally, said conveyors being longitudinally parallel and transversely spaced, the improvements of a transversely movable shuttle plate having a leading edge movable from a retracted position across the first of said conveying means to an advanced position adjacent the second of said conveying means, a pusher plate longitudinally movable in the direction of travel of the second conveying means and having a planar upper surface terminating in a leading edge movable from a retracted position clearing the path of movement of the shuttle plate across the path of movement of the shuttle plate to an advanced position overlapping the second conveyor, a stop parallel to the leading edge of said pusher plate and positioned to substantially overlie the leading edge of said pusher plate when the pusher plate is retracted, and means advancing said plates 180° out of phase to sequentially advance transversely a plurality of slats having a composite width substantially equal to the length of the leading edge of said shuttle plate to deposit said group on the planar upper surface of the pusher plate as the pusher plate is being retracted to contact said group with said stop to drop the slats in front of the leading edge of the pusher plate as retraction thereof continues, and to move said pusher plate toward its advanced position, thereby moving said slats toward and depositing the slats in a group on said second conveyor.

References Cited in the file of this patent

UNITED STATES PATENTS

| | | |
|---|---|---|
| 882,167 | Richardson | Mar. 17, 1908 |
| 1,372,137 | Haverly | Mar. 22, 1921 |
| 1,401,687 | Fogde et al. | Dec. 27, 1921 |
| 1,618,911 | Bent | Feb. 22, 1927 |
| 2,828,794 | Baumann | Apr. 1, 1958 |

FOREIGN PATENTS

| | | |
|---|---|---|
| 356,874 | Great Britain | Sept. 17, 1931 |
| 931,277 | Germany | Aug. 4, 1955 |